US009809107B2

(12) United States Patent
Shibata et al.

(10) Patent No.: US 9,809,107 B2
(45) Date of Patent: Nov. 7, 2017

(54) POWER TRANSMISSION DEVICE

(71) Applicant: TOYOTA JIDOSHA KABUSHIKI KAISHA, Toyota-shi, Aichi-ken (JP)

(72) Inventors: Hiroyuki Shibata, Odawara (JP); Hiroyuki Shioiri, Yokohama (JP); Hideaki Komada, Gotemba (JP); Yuki Kurosaki, Susono (JP); Hong Nam Dang, Susono (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/029,105

(22) PCT Filed: Oct. 3, 2014

(86) PCT No.: PCT/IB2014/002250
§ 371 (c)(1),
(2) Date: Apr. 13, 2016

(87) PCT Pub. No.: WO2015/056087
PCT Pub. Date: Apr. 23, 2015

(65) Prior Publication Data
US 2016/0250917 A1 Sep. 1, 2016

(30) Foreign Application Priority Data

Oct. 15, 2013 (JP) ................................. 2013-215038

(51) Int. Cl.
*F16H 37/06* (2006.01)
*B60K 6/547* (2007.10)
(Continued)

(52) U.S. Cl.
CPC ............. *B60K 6/547* (2013.01); *B60K 6/365* (2013.01); *B60K 6/383* (2013.01); *B60K 6/442* (2013.01);
(Continued)

(58) Field of Classification Search
CPC ........ B60K 6/547; B60K 6/442; B60K 6/383; B60K 6/445; B60K 6/365;
(Continued)

(56) References Cited

U.S. PATENT DOCUMENTS 7,572,201 B2 * 8/2009 Supina ..................... B60K 6/40
180/65.22
8,500,589 B2 * 8/2013 Ortmann ................ B60K 6/387
475/152
(Continued)

FOREIGN PATENT DOCUMENTS

JP 2009-208721 A 9/2009
JP 2009-257533 A 11/2009
(Continued)

*Primary Examiner* — David J Hlavka
(74) *Attorney, Agent, or Firm* — Andrews Kurth Kenyon LLP

(57) ABSTRACT

A power transmission device comprises an engine arranged on a shaft and a first motor. A second motor is arranged on a different shaft from the shaft on which the engine is arranged. A first differential mechanism has a sun gear to which the first motor is connected, a carrier to which the engine is connected, and a ring gear to which the second motor and a drive wheel are connected. A second differential mechanism has a first rotational element to which the first motor is connected, a second rotational element, and a third rotational element to which the engine is connected, and is arranged such that the first motor is located between the first differential mechanism and the second differential mechanism. A case houses the second differential mechanism. A brake mechanism is configured to restrict rotation of the second rotational element and is arranged in the case.

7 Claims, 10 Drawing Sheets

(51) Int. Cl.
  *B60K 6/365* (2007.10)
  *B60K 6/383* (2007.10)
  *B60K 6/445* (2007.10)
  *F16D 48/06* (2006.01)
  *F16H 3/72* (2006.01)
  *B60K 6/442* (2007.10)
  *B60K 6/38* (2007.10)
  *F16H 37/08* (2006.01)
  *F16H 61/00* (2006.01)
  *F16D 41/12* (2006.01)

(52) U.S. Cl.
  CPC .............. *B60K 6/445* (2013.01); *F16D 48/06* (2013.01); *F16H 3/728* (2013.01); *F16H 37/0806* (2013.01); *F16H 37/0833* (2013.01); *B60K 2006/381* (2013.01); *B60Y 2200/92* (2013.01); *B60Y 2300/182* (2013.01); *B60Y 2400/73* (2013.01); *B60Y 2400/80* (2013.01); *F16D 41/125* (2013.01); *F16D 2500/10493* (2013.01); *F16D 2500/50858* (2013.01); *F16D 2500/70663* (2013.01); *F16H 3/727* (2013.01); *F16H 61/0025* (2013.01); *F16H 2037/0866* (2013.01); *F16H 2200/2007* (2013.01); *F16H 2200/2082* (2013.01); *Y02T 10/6239* (2013.01); *Y10S 903/911* (2013.01); *Y10S 903/951* (2013.01)

(58) Field of Classification Search
  CPC ........... B60K 2006/381; F16H 37/0833; F16H 3/727; F16H 37/0806; F16H 3/728; F16H 3/724; F16H 2037/0873; F16H 61/0025; F16H 2200/2007; F16H 2037/0866; F16H 2200/2082; F16D 48/06; F16D 2500/50858; F16D 2500/10493; F16D 2500/70663; F16D 41/125
  See application file for complete search history.

(56) References Cited

U.S. PATENT DOCUMENTS

| | | | | |
|---|---|---|---|---|
| 9,188,172 | B2* | 11/2015 | Fetting | F16D 41/125 |
| 2002/0014359 | A1* | 2/2002 | Schooler | B60K 6/365 |
| | | | | 180/65.235 |
| 2004/0176203 | A1* | 9/2004 | Supina | B60K 6/40 |
| | | | | 475/8 |
| 2010/0200358 | A1* | 8/2010 | Eisengruber | F16D 41/12 |
| | | | | 192/41 S |
| 2010/0252384 | A1* | 10/2010 | Eisengruber | F16D 41/14 |
| | | | | 192/35 |
| 2013/0012347 | A1* | 1/2013 | Ortmann | B60K 6/442 |
| | | | | 475/5 |
| 2013/0035186 | A1* | 2/2013 | Martin | B60K 6/547 |
| | | | | 475/5 |
| 2013/0217538 | A1* | 8/2013 | Martin | B60W 20/40 |
| | | | | 477/5 |

FOREIGN PATENT DOCUMENTS

| | | |
|---|---|---|
| JP | 2010-139052 A | 6/2010 |
| JP | 2013-147124 A | 8/2013 |
| WO | 2013/111275 A1 | 8/2013 |

* cited by examiner

AXIAL DIRECTION

AXIAL DIRECTION

POWER TRANSMISSION DEVICE

CROSS-REFERENCE TO RELATED APPLICATIONS

This is a national phase application based on the PCT International Patent Application No. PCT/IB2014/002250 filed Oct. 3, 2014, claiming priority to Japanese Patent Application No. 2013-215038 filed Oct. 15, 2013, the entire contents of both of which are incorporated herein by reference.

BACKGROUND OF THE INVENTION

1. Field of the Invention

The present invention relates to a power transmission device.

2. Description of Related Art

Conventionally, hybrid vehicles have been available. For example, Japanese Patent Application Publication No. 2010-139052 (JP 2010-139052 A) discloses a technique of a power transmission device in which two motors are arranged on different shafts.

In addition, Japanese Patent Application Publication No. 2009-208721 (JP 2009-208721 A) discloses a technique of a hybrid vehicle that is configured by including an engine and a motor generator and to be switchable between at least two modes of a continuously variable shift mode and a fixed shift ratio mode.

SUMMARY OF THE INVENTION

In a case where a mechanism that allows to switch among a plurality of modes is added to a power transmission device, it is desirable to shorten a process that is related to attachment of the mechanism to be added. For example, if the mechanism to be added can be modularized, the process can be shortened by attaching the module to an existing configuration.

The present invention provides a power transmission device that can shorten a process related to attachment of a mechanism to be added that allows to switch among a plurality of modes.

A first aspect of the present invention is the power transmission device including an engine, a first motor, a second motor, a first differential mechanism, a second differential mechanism, a case, and a brake mechanism. The second motor is arranged on a different shaft from a shaft on which the engine is arranged. The first differential mechanism has a sun gear to which the first motor is connected, a carrier to which the engine is connected, and a ring gear to which the second motor and a drive wheel are connected. The second differential mechanism has a first rotational element to which the first motor is connected, a second rotational element, and a third rotational element to which the engine is connected. The second differential mechanism is arranged such that the first motor is located between the first differential mechanism and the second differential mechanism in an axial direction of the engine. The case houses the second differential mechanism. The brake mechanism is configured to restrict rotation of the second motor. The brake mechanism is configured such that an engine speed is increased by restricting rotation of the second rotational element and the engine speed is output from the ring gear. The brake mechanism is arranged in the case.

In the above aspect, an oil pump may be arranged on a different shaft from a shaft on which the second differential mechanism is arranged. A pump drive gear that rotationally drives the oil pump may be connected to the third rotational element and the pump drive gear may integrally rotate with the third rotational element.

In the above aspect, the brake mechanism may be a selectable one-way clutch that switches between a restriction state in which unidirectional rotation of the second rotational element is restricted and a permission state in which bidirectional rotation of the second rotational element is permitted.

In the above aspect, an electronic control unit may be provided. The electronic control unit may be configured to switch the selectable one-way clutch from the restriction state to the permission state in a state that the second rotational element is rotated in an opposite direction from the unidirectional rotation by the first motor.

In the above aspect, the electronic control unit may be provided. The electronic control unit may be configured to switch the selectable one-way clutch from the permission state to the restriction state in a state that the second rotational element is rotated in an opposite direction from the unidirectional rotation by the first motor.

In the above aspect, the second differential mechanism and the oil pump may be arranged to overlap each other in a radial direction of the second differential mechanism.

According to the above aspect, an effect of shortening a process related to attachment of a mechanism to be added can be exerted.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

A detailed description will hereinafter be made on a power transmission device according to embodiments of the present invention with reference to the drawings. It should be noted that the present invention is not limited to the embodiments described herein. In addition, components in the following embodiments include such components that those skilled in the art can easily conceive or substantially the same components.

A description will hereinafter be made on a first embodiment with reference to FIG. 1 to FIG. 9. This embodiment relates to the power transmission device.

Figure 1:
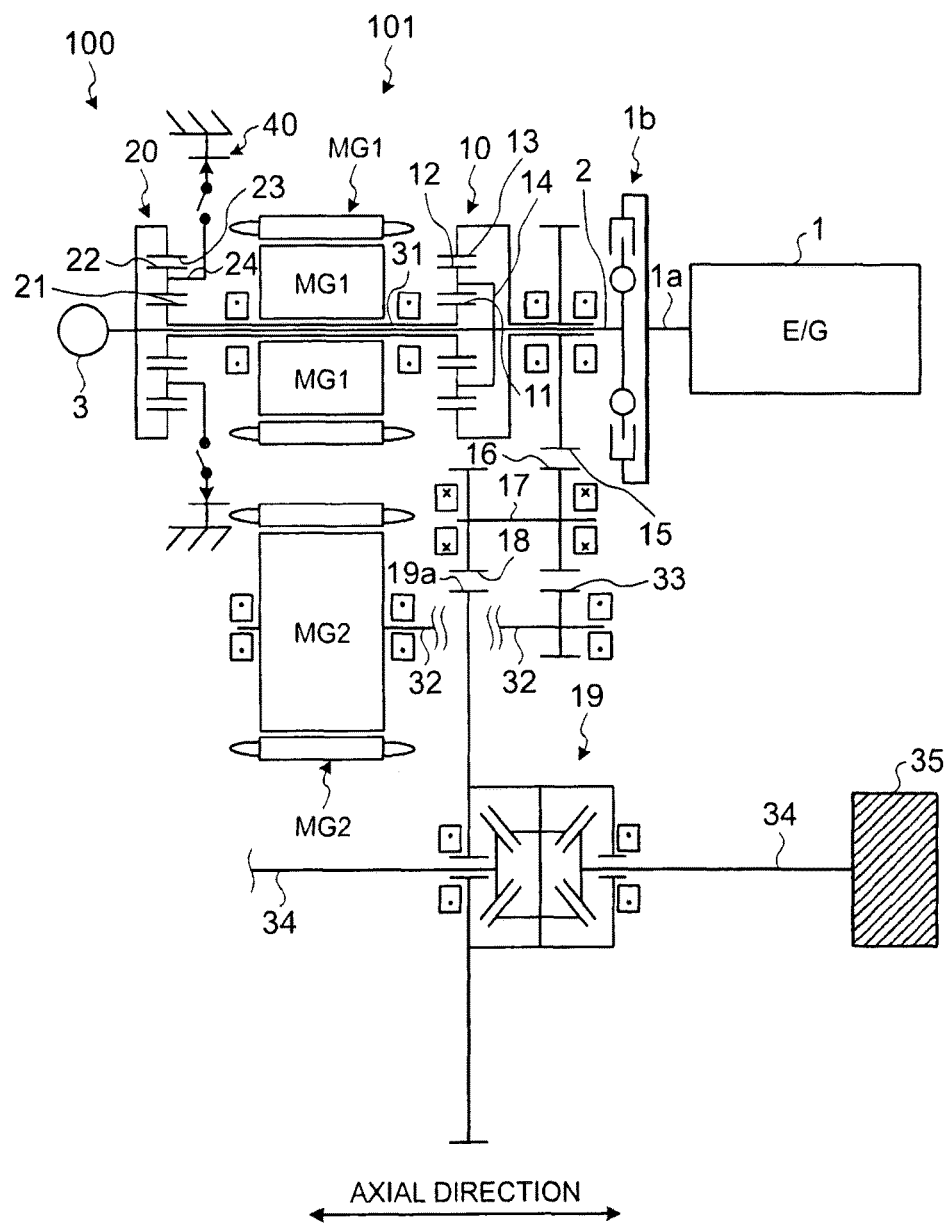
FIG. 1 is a skeletal diagram of a power transmission device according to a first embodiment.

A vehicle 100 shown in FIG. 1 is a hybrid (HV) vehicle that has an engine 1, a first motor MG1, and a second motor MG2 as power sources. The vehicle 100 may be a plug-in hybrid (PHV) vehicle that can be charged by an external electric power source. In addition to the above power sources, the vehicle 100 is configured by including a first differential mechanism 10, a second differential mechanism 20, a selectable one-way clutch (hereinafter referred to as an "SOWC") 40, and an HV_ECU 50 shown in FIG. 2.

A power transmission device 101 according to the first embodiment is configured by including the engine 1, the first motor MG1, the second motor MG2, the first differential mechanism 10, the second differential mechanism 20, and the SOWC 40. The power transmission device 101 may be configured by further including the HV_ECU 50. The power transmission device 101 is applicable to an FF (front-engine, front-wheel-drive) vehicle, an RR (rear-engine, rear-wheel-drive) vehicle, and the like. The power transmission device 101 is installed in the vehicle 100 such that an axial direction thereof corresponds to a vehicle width direction, for example. The power transmission device 101 of this embodiment is a power transmission device of multi-shaft type in which the second motor MG2 is arranged on a different shaft from a shaft on which the engine 1 and the first motor MG1 are arranged.

The engine 1 converts combustion energy of fuel to rotational motion of a crankshaft 1a and outputs the rotational motion of the crankshaft 1a. The crankshaft 1a of the engine 1 is connected to an input shaft 2 via a damper 1b. The input shaft 2 is arranged coaxially with the crankshaft 1a and on an extended line of the crankshaft 1a. The input shaft 2 is connected to a first carrier 14 of the first differential mechanism 10 and a second ring gear 23 of the second differential mechanism 20.

The first differential mechanism 10 is a planetary gear mechanism of single pinion type and has a first sun gear 11, a first pinion gear 12, a first ring gear 13, and the first carrier 14. The first ring gear 13 is arranged coaxially with the first sun gear 11 and on an outer side in a radial direction of the first sun gear 11. The first pinion gear 12 is arranged between the first sun gear 11 and the first ring gear 13, and meshes with the first sun gear 11 and the first ring gear 13. The first pinion gear 12 is rotatably supported by the first carrier 14. The first carrier 14 is coupled to the input shaft 2 and integrally rotates with the input shaft 2. In other words, the first carrier 14 is connected to the engine 1 via the input shaft 2.

Accordingly, the first pinion gear 12 can rotate (revolve) together with the input shaft 2 around a center axis of the input shaft 2, and can also rotate (revolve) about an center axis of the first pinion gear 12 by being supported by the first carrier 14. The first differential mechanism 10 functions as a power dividing mechanism that divides power input from the engine 1 to the first motor MG1 side and a drive wheel 35 side.

The second differential mechanism 20 is a planetary gear mechanism of the single pinion type and has a second sun gear 21, a second pinion gear 22, the second ring gear 23, and a second carrier 24. The second ring gear 23 is arranged coaxially with the second sun gear 21 and on an outer side in a radial direction of the second sun gear 21. The second pinion gear 22 is arranged between the second sun gear 21 and the second ring gear 23, and meshes with the second sun gear 21 and the second ring gear 23. The second pinion gear 22 is rotatably supported by the second carrier 24. The second carrier 24 is coupled to the input shaft 2 and integrally rotates with the input shaft 2.

Accordingly, the second pinion gear 22 can rotate (revolve) together with the input shaft 2 around the center axis of the input shaft 2, and can also rotate (revolve) about a center axis of the second pinion gear 22 by being supported by the second carrier 24.

The first sun gear 11 and the second sun gear 21 are connected to a motor shaft 31 of the first motor MG1 and integrally rotate with the motor shaft 31. The motor shaft 31 is in a cylindrical shape, and is arranged coaxially with the input shaft 2 and on an outer side in a radial direction of the input shaft 2. The motor shaft 31 is supported to be rotatable relative to the input shaft 2.

In the second differential mechanism 20 of this embodiment, the second sun gear 21 is an example of the first rotational element. In addition, the second carrier 24 is an example of the second rotational element whose rotation is restricted by the SOWC 40. Furthermore, the second ring gear 23 is connected to the engine 1 via the input shaft 2 and is an example of the third rotational element.

A counter drive gear 15 is connected to the first ring gear 13. The counter drive gear 15 is arranged between the first differential mechanism 10 and the damper 1b in an axial direction. The counter drive gear 15 meshes with a counter driven gear 16. The counter driven gear 16 is connected to a drive pinion gear 18 via a counter shaft 17. The drive pinion gear 18 meshes with a differential ring gear 19a of a differential device 19. The differential device 19 is connected to the drive wheels 35 via right and left drive shafts 34.

The counter driven gear 16 meshes with a reduction gear 33. The reduction gear 33 is connected to a motor shaft 32 of the second motor MG2. The reduction gear 33 has a smaller diameter than the counter driven gear 16, decelerates rotation of the second motor MG2, and transmits the rotation of the second motor MG2 to the counter driven gear 16. Power transmitted from the engine 1 and the first motor MG1 and power transmitted from the second motor MG2 are combined in the counter driven gear 16 and transmitted to the drive wheel 35. The first ring gear 13 is connected to the second motor MG2 and the drive wheel 35 via the counter drive gear 15.

An oil pump 3 is arranged at an end of the input shaft 2 that is on an opposite side of the engine 1 side. The oil pump 3 is rotationally driven by the rotation of the input shaft 2, and discharges oil. The oil pump 3 supplies the oil to various portions of the power transmission device 101 such as the engine 1, the first motor MG1, the second motor MG2, the first differential mechanism 10, and the second differential mechanism 20.

The first motor MG1 and the second motor MG2 each have a function as a motor (an electric motor) and a function as a generator. The first motor MG1 and the second motor MG2 are connected to a battery via an inverter. The first motor MG1 and the second motor MG2 can convert electric power supplied from the battery to mechanical power and can output the mechanical power. In addition, the first motor MG1 and the second motor MG2 are driven by input power, and can convert the mechanical power to the electric power. The electric power generated by the motors MG1, MG2 can be charged in the battery. As each of the first motor MG1 and the second motor MG2, a motor generator of AC synchronous type can be used, for example.

Figure 2:
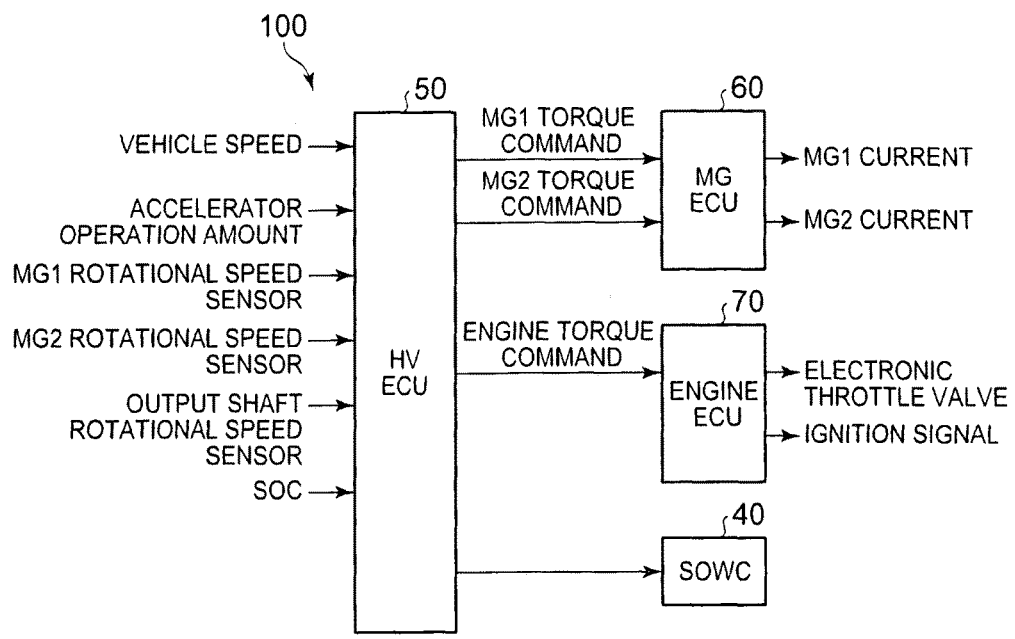
FIG. 2 is a block diagram of a vehicle according to the first embodiment.

As shown in FIG. 2, the vehicle 100 has the HV_ECU 50, an MG_ECU 60, and an engine ECU 70. Each of the ECUs 50, 60, 70 is an electronic control unit with a computer. The HV_ECU 50 has a function for total control of the entire vehicle 100. The MG_ECU 60 and the engine ECU 70 are electrically connected to the HV_ECU 50.

The MG_ECU 60 controls the first motor MG1 and the second motor MG2. The MG_ECU 60 adjusts a value of current that is supplied to the first motor MG1 and also adjusts a value of current that is supplied to the second motor MG2, for example. The MG_ECU 60 can thereby control output torque of the first motor MG1 and output torque of the second motor MG2.

The engine ECU 70 controls the engine 1. The engine ECU 70 can control an opening amount of an electronic throttle valve of the engine 1, control ignition of the engine 1 by outputting an ignition signal, control injection of the fuel to the engine 1, and the like, for example. The engine ECU 70 can control output torque of the engine 1 by the control of the opening amount of the electronic throttle valve, the injection control, the ignition control, and the like.

The HV_ECU 50 is connected to a vehicle speed sensor, an accelerator operation amount sensor, an MG1 rotational speed sensor, an MG2 rotational speed sensor, an output shaft rotational speed sensor, a battery sensor, and the like. The HV_ECU 50 can acquire a vehicle speed, an accelerator operation amount, a rotational speed of the first motor MG1, a rotational speed of the second motor MG2, a rotational speed of an output shaft of the power transmission device 101, an SOC of the battery, and the like from these sensors.

Based on acquired information, the HV_ECU 50 can compute a requested drive force, requested power, requested torque, and the like for the vehicle 100. Based on computed requested values, the HV_ECU 50 determines the output torque of the first motor MG1 (hereinafter also described as "MG1 torque"), the output torque of the second motor MG2 (hereinafter also described as "MG2 torque"), and the output torque of the engine 1 (hereinafter also described as "engine torque"). The HV_ECU 50 outputs a command value of the MG1 torque and a command value of the MG2 torque to the MG_ECU 60. In addition, the HV_ECU 50 outputs a command value of the engine torque to the engine ECU 70. The HV_ECU 50 controls the SOWC 40 on the basis of a travel mode, which will be described below.

The power transmission device 101 mainly has two travel modes of an HV travel mode and an EV travel mode. The HV travel mode is a travel mode in which vehicle travels by the engine 1 as the power source. In the HV travel mode, the second motor MG2 can further be used as the power source. The EV travel mode is a travel mode in which the vehicle travels by the second motor MG2 as the power source.

Figure 3:
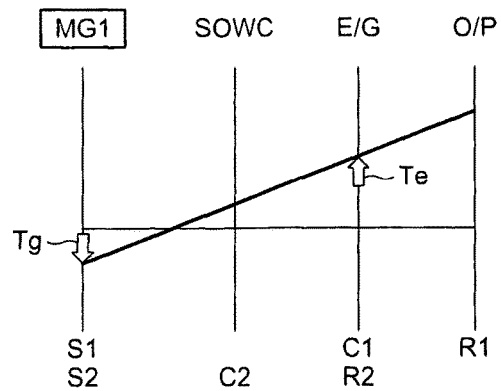
FIG. 3 is a collinear diagram according to a THS mode of the power transmission device according to the first embodiment.

The power transmission device 101 of this embodiment has an THS mode and an OD lock mode as the HV travel modes. Referring to FIG. 3, the THS mode will be described. In collinear diagrams of FIG. 3, FIG. 5, and FIG. 7, the first sun gear 11, the first carrier 14, and the first ring gear 13 are respectively indicated as "S1", "C1", and "R1". In addition, the second sun gear 21, the second carrier 24, and the second ring gear 23 are respectively indicated as "S2", "C2", and "R2".

The THS mode is a travel mode in which a reaction force against power of the engine 1 is generated by the first motor MG1 to run the vehicle. As shown in FIG. 3, when the vehicle 100 travels forward, the first motor MG1 outputs torque Tg in a reverse direction with respect to torque Te in a positive direction of the engine 1. Accordingly, the first motor MG1 functions as a reaction receiver for the engine torque Te, and outputs the engine torque Te from the first ring gear 13 toward the drive wheel 35. In this specification, the "positive direction" indicates a rotational direction of the first ring gear 13 when the vehicle 100 travels forward. In this specification, the "reverse direction" indicates a rotational direction that is opposite from the positive direction.

Figure 4:
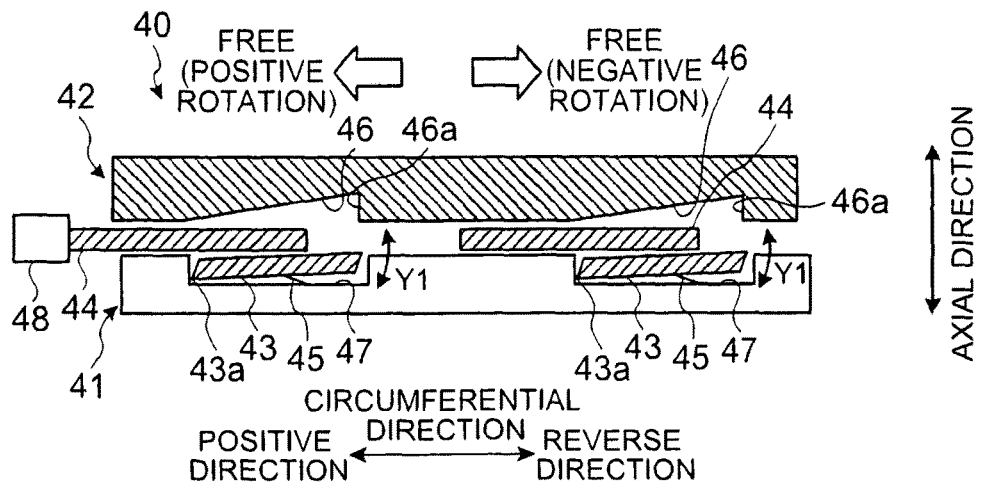
FIG. 4 is a view for showing a selectable one-way clutch in the THS mode.

When executing the THS mode, the HV_ECU 50 brings the SOWC 40 into a permission state. Referring to FIG. 4, a configuration of the SOWC 40 will be described. The SOWC 40 is an example of a brake mechanism and is a one-way clutch of selectable type that can switch between the permission state and a restriction state. The permission state is a state that the SOWC 40 permits bidirectional rotation of the second carrier 24. On the other hand, the restriction state is a state that the SOWC 40 restricts unidirectional rotation of the second carrier 24. In the restriction state, the SOWC 40 of this embodiment restricts the rotation in the positive direction of the second carrier 24 and permits the rotation in the reverse direction.

As shown in FIG. 4, the SOWC 40 is configured by including a fixed side race 41, a rotational side race 42, a strut 43, a selector plate 44, and a spring 45. FIG. 4 is a side view in which the SOWC 40 is seen from the outer side in the radial direction.

The fixed side race 41 and the rotational side race 42 are each a disc shaped member. The fixed side race 41 and the rotational side race 42 are coaxially arranged with the second differential mechanism 20. The fixed side race 41 is a member that is fixed to a vehicle body side and is unrotatable. The rotational side race 42 is coaxially arranged with the fixed side race 41 so as to face the fixed side race 41. The rotational side race 42 is supported in a manner capable of relative rotation to the fixed side race 41. The rotational side race 42 is coupled to the second carrier 24 and integrally rotates with the second carrier 24.

The strut 43 abuts against an engagement recess 46 of the rotational side race 42 and thereby restricts rotation of the rotational side race 42. The engagement recess 46 is arranged on a surface of the rotational side race 42 that faces the fixed side race 41. The engagement recess 46 is a groove whose depth is increased toward the reverse direction side in a circumferential direction. An end on the reverse direction side of the engagement recess 46 is a wall surface 46a. The wall surface 46a is a surface that is orthogonal to the circumferential direction. The plurality of engagement recesses 46 is arranged at specified intervals along the circumferential direction.

The strut 43 is a plate member and arranged in a groove 47 of the fixed side race 41. The plurality of struts 43 and the plurality of grooves 47 are provided, so as to correspond to the plurality of engagement recesses 46. The groove 47 is arranged in a surface of the fixed side race 41 that faces the rotational side race 42. An end 43a on the positive direction side of the strut 43 is held by the groove 47. The strut 43 is turnable in a rotational direction indicated by an arrow Y1 with the end 43a as a fulcrum.

The spring 45 is a spring that is arranged between a bottom of the groove 47 and the strut 43. The spring 45 presses the strut 43 in the axial direction toward the rotational side race 42. The selector plate 44 is a switching member that selectively switches the SOWC 40 to either the permission state or the restriction state. The selector plate 44 is a plate member that is arranged between the fixed side race 41 and the rotational side race 42. The selector plate 44 can move relative to the fixed side race 41 in the circumferential direction. The one selector plate 44 is arranged for the one strut 43.

Figure 6:
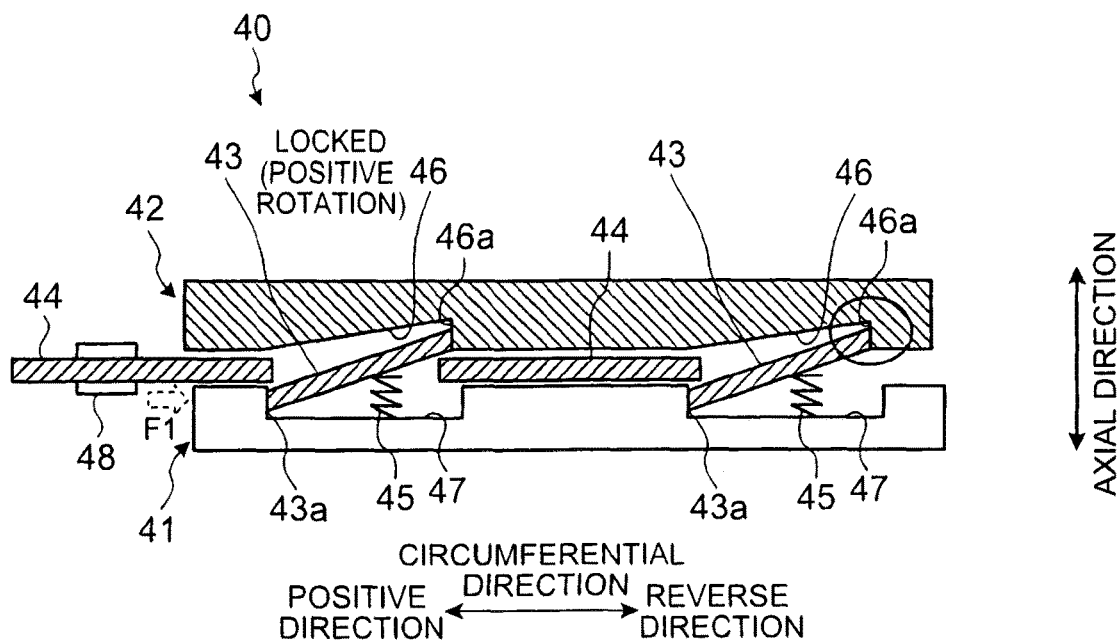
FIG. 6 is a view for showing the selectable one-way clutch in the OD lock mode.

The selector plate 44 moves relative to the fixed side race 41 by thrust of an actuator 48. The selector plates 44 are coupled to each other and integrally move with each other. The selector plate 44 is configured such that, in accordance with a position thereof in the circumferential direction, selectively executes a state that the strut 43 is housed in the groove 47 as shown in FIG. 4 or a state that the strut 43 is engaged with the engagement recess 46 as shown in FIG. 6.

As shown in FIG. 4, the rotation of the rotational side race 42 is not restricted in the state that the strut 43 is housed in the groove 47. In other words, the rotational side race 42 can rotate either in the positive direction or in the reverse direction. This state is the permission state of the SOWC 40, and the second carrier 24 is permitted to rotate either in the positive direction or in the reverse direction. Referring to FIG. 3, a rotational speed of the second carrier 24 (the C2 axis) can be adjusted to any rotational speed of either a positive rotational speed or a negative rotational speed. Thus, the first motor MG1 can be operated at an arbitrary rotational speed in accordance with an operation state or the like.

When executing the OD lock mode, the HV_ECU 50 brings the SOWC 40 into the restriction state. The HV_ECU 50 commands the actuator 48 of the SOWC 40, so as to move the selector plate 44 to a position at which the strut 43 can engage with the engagement recess 46. The actuator 48 moves the selector plate 44 in the positive direction to open the groove 47. Accordingly, the strut 43 that has been pressed by the spring 45 is projected from the groove 47 toward the rotational side race 42. The strut 43 moves toward the rotational side race 42 and, as shown in FIG. 6, abuts against the wall surface 46a of the engagement recess 46. As a result, the rotation in the positive direction of the rotational side race 42 is restricted.

Figure 5:
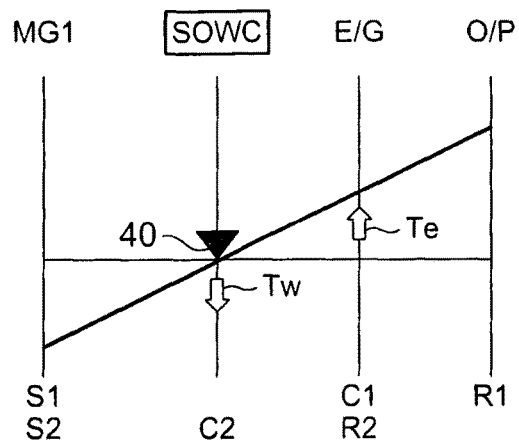
FIG. 5 is a collinear diagram according to an OD lock mode of the power transmission device according to the first embodiment.

Thus, as shown in FIG. 5, the SOWC 40 restricts positive rotation of the second carrier 24 (the C2 axis). The SOWC 40 generates reaction torque Tw with respect to the engine torque Te and functions as the reaction receiver for the engine torque Te. Due to the reaction torque Tw, the SOWC 40 outputs the engine torque Te from the first ring gear 13.

As shown in FIG. 5, in the OD lock mode, a rotational speed of the first carrier 14 (a C1 axis) is lower than a rotational speed of the first ring gear 13 (the R1 axis), and a speed input from the engine 1 is increased and output from the first ring gear 13. In other words, the SOWC 40 restricts the rotation of the second carrier 24 as the second rotational element and thereby produces an overdrive state in which the speed of the engine 1 is increased and output from the first ring gear 13.

Here, it is preferred to reduce the thrust of the actuator 48 that is required when the state of the SOWC 40 is switched. For example, in the case where the SOWC 40 is switched from the restriction state of the SOWC 40, which is shown in FIG. 6, to the permission state, it is necessary to cancel engagement between the strut 43 and the engagement recess 46 by thrust F1 of the actuator 48. At this time, if the SOWC 40 transmits the reaction torque Tw, a magnitude of the required thrust F1 depends on the transmission torque.

Accordingly, in the state that the SOWC 40 transmits the reaction torque Tw, if the SOWC 40 is switched to the permission state, a maximum value of the thrust F1 that can be generated has to be defined in accordance with the maximum reaction torque Tw. This causes enlargement of the actuator 48.

As will be described below, in the power transmission device 101 according to this embodiment, in the case where the SOWC 40 is switched from the restriction state to the permission state, the SOWC 40 is switched from the restriction state to the permission state while the first motor MG1 rotates the second carrier 24 in the reverse direction. Accordingly, it is possible to suppress fluctuation in the required thrust F1 of the actuator 48 and also to lower the maximum value of the required thrust F1.

Figure 7:
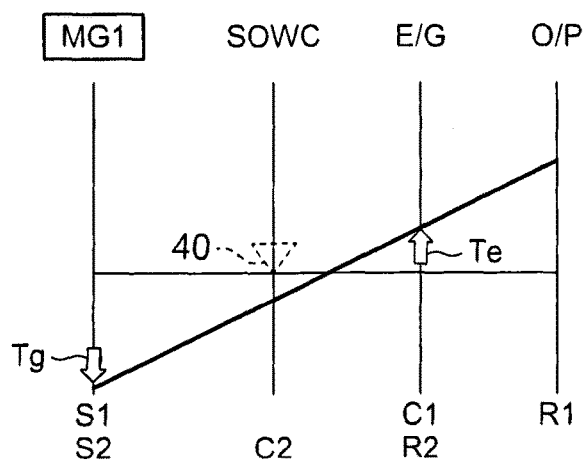
FIG. 7 is a collinear diagram according to a time during a mode transition of the power transmission device according to the first embodiment.
Figure 8:
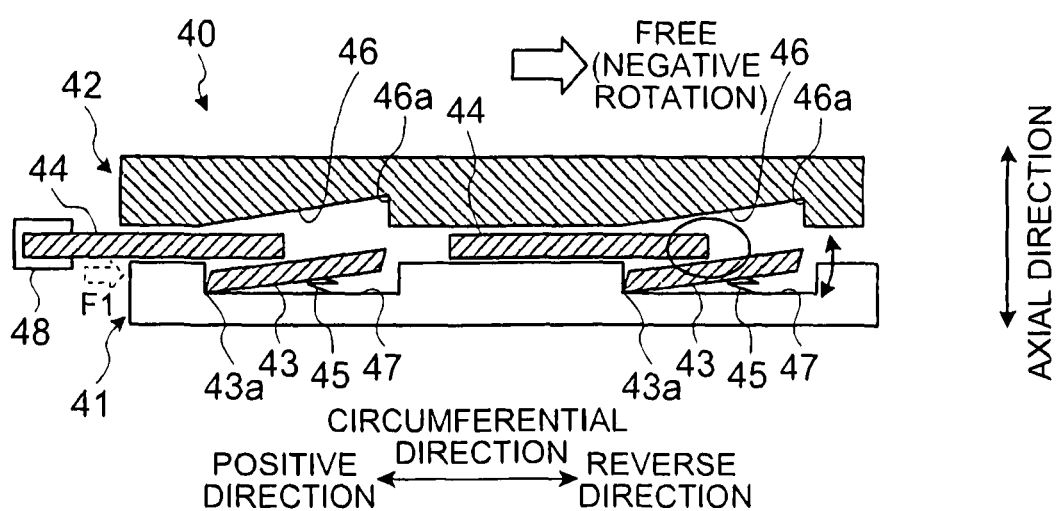
FIG. 8 is a view for illustrating necessary thrust during the mode transition.

As shown in FIG. 7, when transition from the OD lock mode to the THS mode is made, the HV_ECU 50 rotates the second carrier 24 (the C2 axis) in the reverse direction by the first motor MG1. At this time, the first motor MG1 functions as the reaction receiver for the engine torque Te. As shown in FIG. 8, when the rotational side race 42 rotates in the reverse direction, the thrust F1 that is required to switch from the restriction state to the permission state is determined by kinetic friction between the selector plate 44 and the strut 43, kinetic friction between the selector plate 44 and each of the races 41, 42, and a load generated by a pressing force of the spring 45. Since the SOWC 40 does not transmit torque, the fluctuation of the required thrust F1 that is caused by disturbance such as the transmission torque is suppressed. Thus, according to the power transmission device 101 according to this embodiment, the actuator 48 can be downsized.

Here, the HV_ECU 50 may rotate the first motor MG1 rotate the second carrier 24 in the reverse direction by the first motor MG1 not only in the case where the SOWC 40 is switched from the restriction state to the permission state, but also in the case where the SOWC 40 is switched from the permission state to the restriction state. The thrust F1 that is requested during switching can be reduced by switching the SOWC 40 from the permission state to the restriction state while the second carrier 24 rotates in the reverse direction.

In the power transmission device 101 according to this embodiment, the second differential mechanism 20 and the SOWC 40 are arranged in a manner that components can be commonalized with a conventional power transmission device. As shown in FIG. 1, the second differential mechanism 20 is arranged on an opposite side of the first differential mechanism 10 in the axial direction with the first motor MG1 being interposed therebetween. The second differential mechanism 20 is arranged such that the first motor MG1 is located between the first differential mechanism 10 and the second differential mechanism 20 in the axial direction. The first differential mechanism 10 is arranged on the engine 1 side of the first motor MG1, and the second differential mechanism 20 is arranged on the opposite side of the engine 1 side and farther away from the engine 1 than the first motor MG1. The SOWC 40 is also arranged on the opposite side of the first differential mechanism 10 in the axial direction with the first motor MG1 being interposed therebetween. The SOWC 40 is arranged such that the first motor MG1 is located between the first differential mechanism 10 and the SOWC 40 in the axial direction. Thus, in a case where the second differential mechanism 20 and the SOWC 40 are added to the power transmission device that has the engine 1, the first differential mechanism 10, and the first motor MG1 as existing components and in which the engine 1 and the second motor MG2 are arranged on different shafts, the components can be commonalized to the maximum.

As will be described below with reference to FIG. 9, the SOWC 40 is arranged in a case 4 for housing the second differential mechanism 20. Thus, the SOWC 40 and the second differential mechanism 20 can be assembled with the case and the like in advance. Therefore, it is possible to shorten a process of assembling mechanisms to be added (the SOWC 40 and the second differential mechanism 20).

Figure 9:
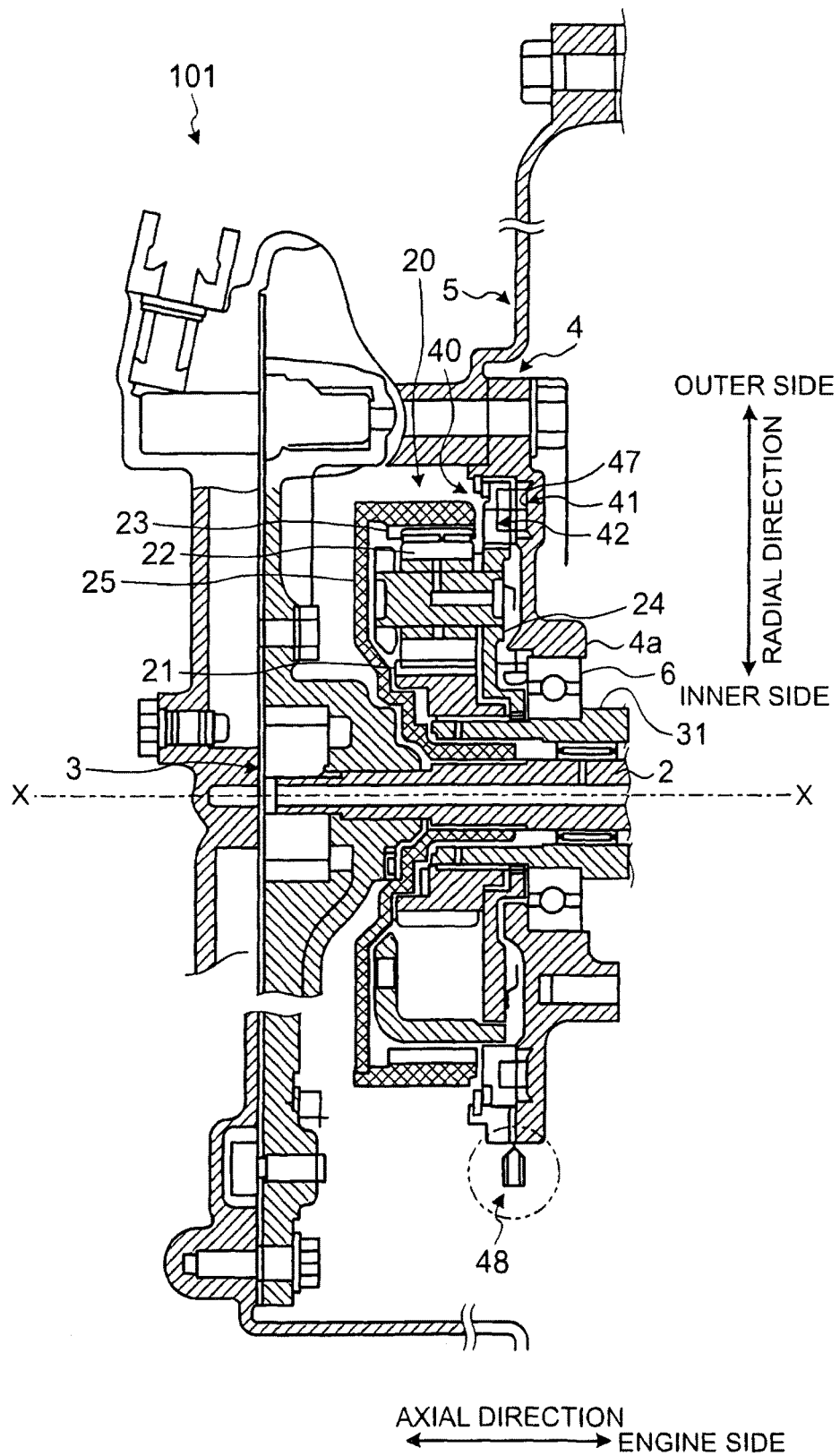
FIG. 9 is a cross-sectional view of a main section of the power transmission device according to the first embodiment.

As shown in FIG. 9, the power transmission device 101 has the case 4 and a cover 5. The case 4 is a rear case, for example. The case 4 may house the first motor MG1 and the first differential mechanism 10 therein, in addition to the second differential mechanism 20. The second differential mechanism 20 and the SOWC 40 are housed by the case 4 and the cover 5. The case 4 has a center support 4a. The center support 4a is a support section that is projected to the inner side in the radial direction from an outer shell of the case 4. Here, the "radial direction" indicates a radial direction that is orthogonal to a center axis X with the center axis X of the input shaft 2 being the center. The motor shaft 31 of the first motor MG1 is supported by a tip, that is, an end on the inner side in the radial direction of the center support 4a via a bearing 6.

The second sun gear 21 of the second differential mechanism 20 is fitted to the motor shaft 31 in a manner incapable of relative rotation to the motor shaft 31, and is supported by the center support 4a via the motor shaft 31 and the bearing 6. A connection member 25 is coupled to the second ring gear 23. The connection member 25 is arranged on the opposite side of the engine 1 side in the axial direction with respect to the second ring gear 23. The connection member 25 is arranged such that the second ring gear 23 is located between the engine 1 and the connection member 25 in the axial direction. The connection member 25 is an annular shaped member, and an end thereof on the inner side in the radial direction is fitted to the input shaft 2 in a manner incapable of relative rotation to the input shaft 2.

The SOWC 40 is arranged between the center support 4a and the second differential mechanism 20 in the axial direction. The fixed side race 41 of the SOWC 40 is fixed to the center support 4a in a manner incapable of relative rotation to the center support 4a. More specifically, the fixed side race 41 is formed in a surface of the center support 4a that is on an opposite side from the engine 1 side. In other words, in this embodiment, the groove 47 is formed in the center support 4a, and the center support 4a functions as the fixed side race 41. The rotational side race 42 is arranged on the opposite side of the engine 1 side with respect to the fixed side race 41. The rotational side race 42 is arranged such that the fixed side race 41 is located between the engine 1 and the rotational side race 42. The rotational side race 42 is rotatably supported by the fixed side race 41. The rotational side race 42 is arranged on the outer side in the radial direction of the second carrier 24, and is coupled to the second carrier 24. In other words, a position of the rotational side race 42 in the axial direction overlaps that of the second carrier 24, and thus is arranged such that the rotational side race 42 and the second carrier 24 overlap each other when seen in the radial direction.

The cover 5 is arranged on the opposite side of the engine 1 side with respect to the case 4. The cover 5 is arranged such that the case 4 is located between the engine 1 and the cover 5. The cover 5 closes the case 4 and, together with the case 4, houses the second differential mechanism 20, the SOWC 40, the oil pump 3, and the like therein.

According to the power transmission device 101 of this embodiment, the second differential mechanism 20, the SOWC 40, the oil pump 3, and the cover 5 can be assembled in advance. Thus, during the assembly of the power transmission device 101, it is possible to shorten the process of assembling the second differential mechanism 20, the SOWC 40, the oil pump 3, and the cover 5.

In the power transmission device 101 according to this embodiment, the second carrier 24 is fixed in the OD lock mode. Since the second carrier 24 does not revolve, there is an advantage that loss caused by centrifugal loads of the second carrier 24 and the second pinion gear 22 is not generated.

A rotor of the first motor MG1 is supported by the center support 4a. Since the SOWC 40 and the second differential mechanism 20 are integrated and added, there is no need to change the arrangement of the bearing 6 in the axial direction. In addition, the SOWC 40 and the second differential mechanism 20 can be integrated and added without increasing the number of mating surfaces of the case that houses a transaxle portion including each of the differential mechanisms 10, 20, the motors MG1, MG2, and the like. Thus, it is advantageous in terms of suppression of oil leakage.

The fixed side race 41 of the SOWC 40 is integrated with the center support 4a. Thus, the power transmission device 101 according to this embodiment is advantageous in terms of downsizing, reduction in an axial length, a reduction in the number of components, and the like.

Figure 10:
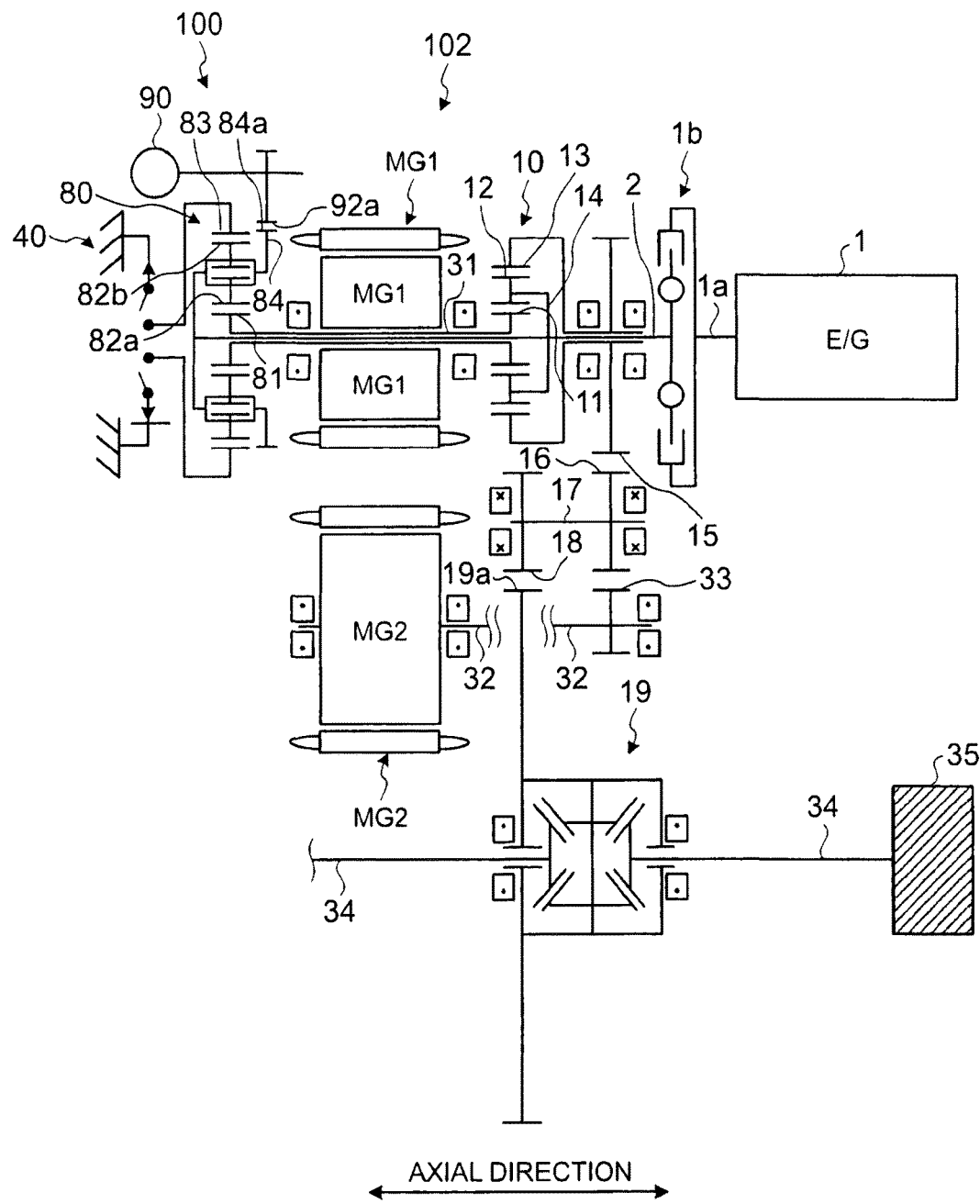
FIG. 10 is a skeletal diagram of a power transmission device according to a second embodiment.
Figure 11:
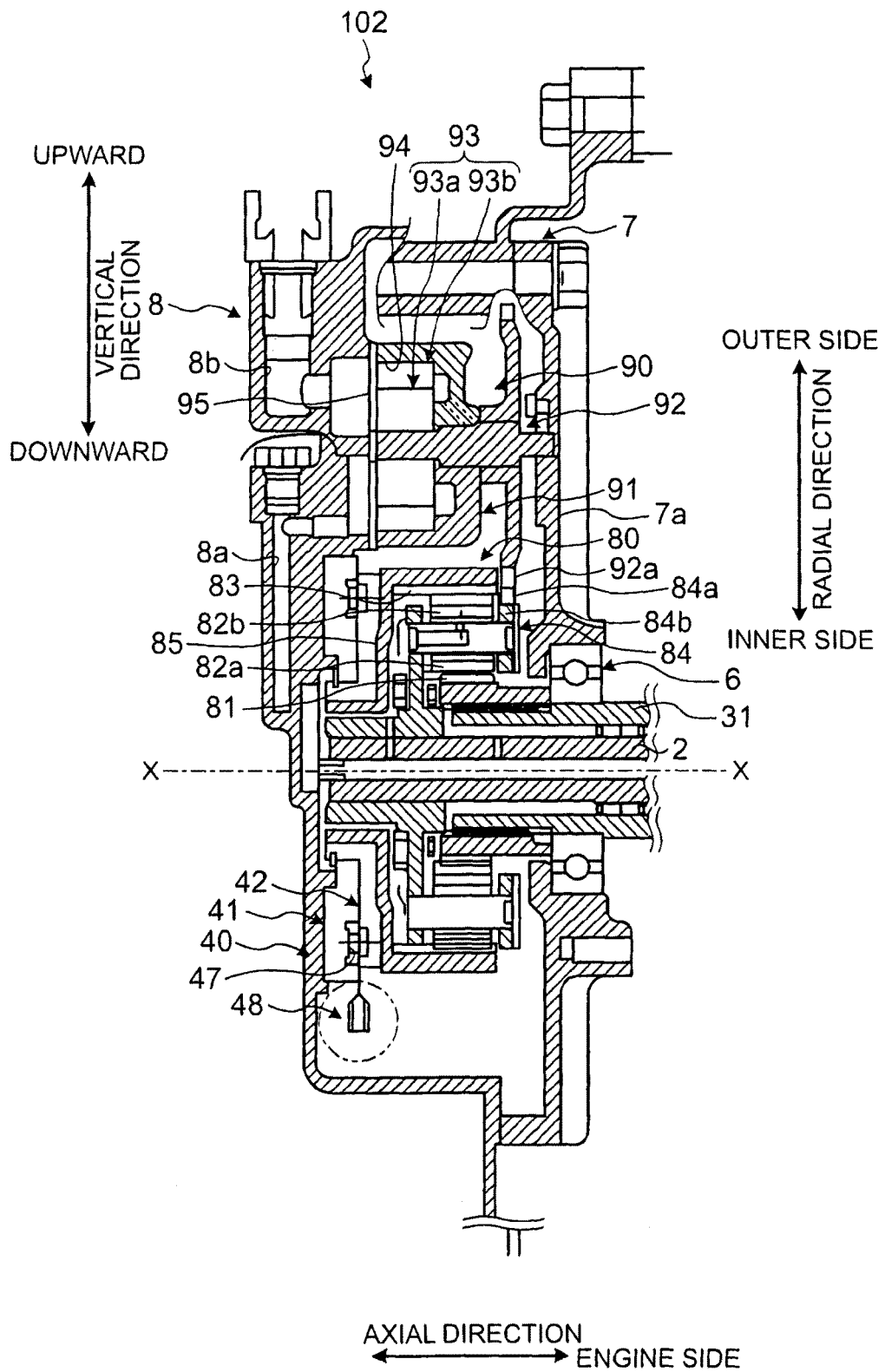
FIG. 11 is a cross-sectional view of a main section of the power transmission device according to the second embodiment.
Figure 12:
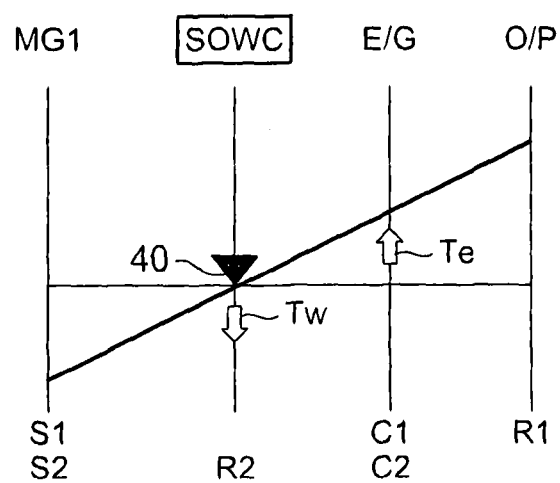
FIG. 12 is a collinear diagram according to the OD lock mode of the power transmission device according to the second embodiment.

A second embodiment will be described with reference to FIG. 10 to FIG. 12. In the second embodiment, the components that have the same functions as those described in the first embodiment are denoted by the same reference numerals, and the repetitive description will not be made. FIG. 10 is a skeletal diagram of a power transmission device according to a second embodiment, FIG. 11 is a cross-sectional view of a main section of the power transmission device according to the second embodiment, and FIG. 12 is a collinear diagram according to the OD lock mode of the power transmission device according to the second embodiment. A power transmission device 102 of this embodiment differs from the power transmission device 101 of the above the first embodiment in a point that a second differential mechanism 80 is a planetary gear mechanism of double pinion type and in a point that an oil pump 90 is arranged on a different shaft from a shaft on which the second differential mechanism 80 is arranged and the oil pump 90 is rotationally driven by a second carrier 84.

As shown in FIG. 10, like the second differential mechanism 20 of the above first embodiment, the second differential mechanism 80 is arranged on the opposite side of the first differential mechanism 10 in the axial direction with the first motor MG1 being interposed therebetween. Like the second differential mechanism 20 of the above first embodiment, the second differential mechanism 80 is arranged such that the first motor MG1 is located between the first differential mechanism 10 and the second differential mechanism 80 in the axial direction. The second differential mechanism 80 is the planetary gear mechanism of the double pinion type, and has a second sun gear 81, an inner side second pinion gear 82a, an outer side second pinion gear 82b, a second ring gear 83, and the second carrier 84.

The second ring gear 83 is coaxially arranged with the second sun gear 81 and is also arranged on the outer side in the radial direction of the second sun gear 81. The inner side second pinion gear 82a and the outer side second pinion gear 82*b* are arranged between the second sun gear 81 and the second ring gear 83. The inner side second pinion gear 82*a* meshes with the second sun gear 81 and the outer side second pinion gear 82*b*. The outer side second pinion gear 82*b* meshes with the inner side second pinion gear 82*a* and the second ring gear 83. The second pinion gears 82*a*, 82*b* are rotatably supported by the second carrier 84. The second carrier 84 is coupled to the input shaft 2 and integrally rotates with the input shaft 2.

Accordingly, the second pinion gears 82*a*, 82*b* can rotate (revolve) together with the input shaft 2 around the center axis of the input shaft 2, and can also rotate (revolve) about an center axis of each of the second pinion gears 82*a*, 82*b* by being supported by the second carrier 84.

The second sun gear 81 is connected to the motor shaft 31 of the first motor MG1 and integrally rotates with the motor shaft 31. The second carrier 84 is connected to the engine 1 via the input shaft 2. The second ring gear 83 is connected to the SOWC 40, and rotation thereof is restricted by the SOWC 40.

Thus, in the second differential mechanism 80 of this embodiment, the second sun gear 81 is an example of the first rotational element. The second ring gear 83 is an example of the second rotational element. The second carrier 84 is an example of the third rotational element.

The oil pump 90 of this embodiment is arranged on the different shaft from the shaft on which the second differential mechanism 80 is arranged. The second carrier 84 has a pump drive gear 84*a* that rotationally drives the oil pump 90. The pump drive gear 84*a* is connected to the second carrier 84 and integrally rotates with the second carrier 84. The oil pump 90 has an input gear 92*a* that meshes with the pump drive gear 84*a*. The oil pump 90 is rotationally driven by torque that is input from the pump drive gear 84*a* to the input gear 92*a*. In the power transmission device 102 according to this embodiment, a position of the second differential mechanism 80 in the axial direction overlaps that of the oil pump 90, and the second differential mechanism 80 and the oil pump 90 are arranged such that the second differential mechanism 80 and the oil pump 90 overlap each other in the radial direction of the second differential mechanism 80. Thus, it is possible to reduce the axial length in regard to arrangement of the second differential mechanism 80 and the oil pump 90. As a result, since the SOWC 40 can be arranged by using an empty space, it is possible to reduce a radius of the SOWC 40 and the like.

A detailed description will be made on the arrangement of the second differential mechanism 80, the SOWC 40, the oil pump 90, and the like with reference to FIG. 11. As shown in FIG. 11, the power transmission device 102 has a case 7 and a cover 8. The motor shaft 31 of the first motor MG1 is rotatably supported by a center support 7*a* of the case 7 via the bearing 6.

The second sun gear 81 is connected to the motor shaft 31 in a manner incapable of relative rotation to the motor shaft 31. The second ring gear 83 is connected to the rotational side race 42 of the SOWC 40 via a connection member 85 in a manner incapable of relative rotation to the rotational side race 42. The connection member 85 is arranged on the opposite side of the engine 1 side in the axial direction with respect to the second ring gear 83. The connection member 85 is arranged such that the second ring gear 83 is located between the engine 1 and the connection member 85. The connection member 85 is an annular shaped member. The rotational side race 42 is arranged on the opposite side of the second ring gear 83 side with respect to the connection member 85. The rotational side race 42 is arranged such that the connection member 85 is located between the second ring gear 83 and the rotational side race 42.

The oil pump 90 is arranged on the different shaft from the input shaft 2. In the power transmission device 102 of this embodiment, the oil pump 90 is arranged upward in a vertical direction with respect to the second differential mechanism 80. The oil pump 90 is configured by including a pump body 91, a pump shaft 92, a pump rotor 93, and a pump chamber 94. The pump body 91 is a hollow member in a substantially cylindrical shape. An end in the axial direction of the pump body 91 is opened, and an opening is closed by a partition member 95. The pump chamber 94 is a hollow portion of the pump body 91, and is surrounded by the pump body 91 and the partition member 95.

The pump rotor 93 is arranged in the pump chamber 94. The pump rotor 93 has a drive rotor 93*a* and a driven rotor 93*b*. The drive rotor 93*a* is coupled to the pump shaft 92. The pump shaft 92 penetrates the pump body 91 and is rotatably supported by the pump body 91. The input gear 92*a* is coupled to the pump shaft 92.

A carrier flange 84*b* of the second carrier 84 has the pump drive gear 84*a*. The pump drive gear 84*a* is arranged on an outer circumferential surface of the carrier flange 84*b*. The pump drive gear 84*a* meshes with the input gear 92*a* of the oil pump 90. When the second carrier 84 rotates, the rotation thereof is transmitted from the pump drive gear 84*a* to the oil pump 90 via the input gear 92*a*. Accordingly, the pump shaft 92 and the drive rotor 93*a* are rotationally driven. The oil is pressurized by rotation of the drive rotor 93*a* and the driven rotor 93*b* in the pump chamber 94.

A supply oil passage 8*a* and a discharge oil passage 8*b* are formed in the cover 8. The oil is suctioned into the pump chamber 94 via the supply oil passage 8*a* by rotation of the pump rotor 93. In addition, the oil that has been compressed by the pump rotor 93 is pushed out into the discharge oil passage 8*b* and supplied to various portions, in the power transmission device 102.

In the power transmission device 102 of this embodiment, the pump body 91 can be downsized by shortening the discharge oil passage 8*b* that connects valves arranged on an outer circumference of the second differential mechanism 80 and a pump discharge section.

As shown in FIG. 10, the oil pump 90 is connected to the engine 1 via the second carrier 84 and the input shaft 2. Accordingly, in the OD lock mode shown in FIG. 12, the oil pump 90 rotates in conjunction with rotation of the engine 1, and thus can supply the oil. When the SOWC 40 is brought into the restriction state in the OD lock mode, the SOWC 40 restricts the rotation in the positive direction of the second ring gear 83 (an R2 axis). The SOWC 40 functions as the reaction receiver for the engine torque Te, and outputs the engine torque Te from the first ring gear 13.

Since the second carrier 84 rotates in the OD lock mode, the second carrier 84 can use a centrifugal force thereof to deliver the oil to the outer side in the radial direction. Thus, there is an advantage that lubrication performance of the second differential mechanism 80 and the SOWC 40 is improved.

Figure 13:
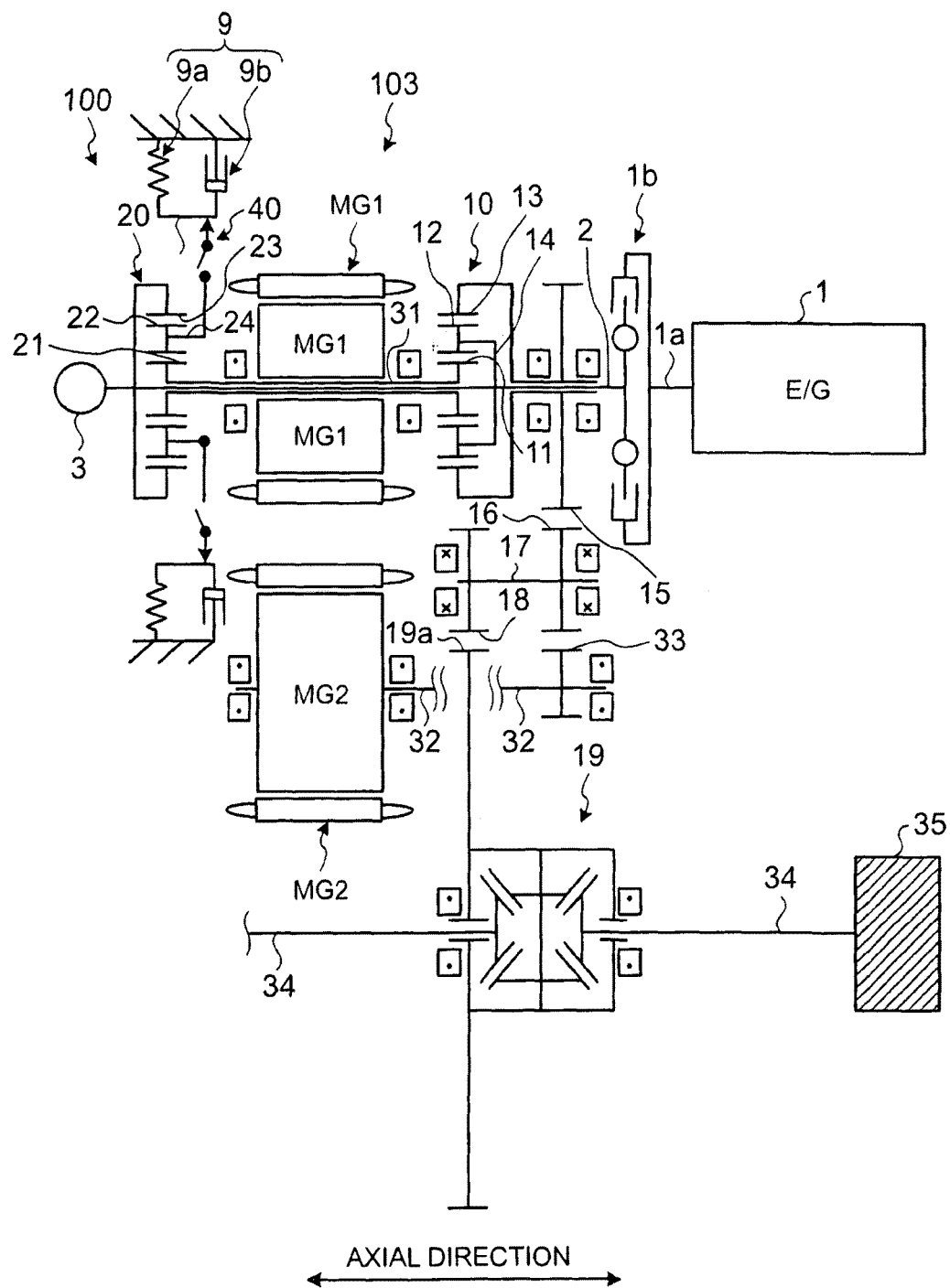
FIG. 13 is a skeletal diagram of a power transmission device according to a third embodiment.

A third embodiment will be described with reference to FIG. 13. In the third embodiment, the components that have the same functions as those described in the first or second embodiment are denoted by the same reference numerals, and the repetitive description will not be made. FIG. 13 is a skeletal diagram of a power transmission device according to a third embodiment. A power transmission device 103 of the third embodiment differs from the power transmission devices 101, 102 of each of the above embodiments in a point that the SOWC 40 is connected to the vehicle body side via a vibration control mechanism 9.

As shown in FIG. 13, the fixed side race 41 of the SOWC 40 is fixed to the vehicle body side via the vibration control mechanism 9 so as to be incapable of rotating. The vibration control mechanism 9 has a function as a spring mechanism 9a and a vibration control mechanism 9b. The vibration control mechanism 9 of this embodiment functions as the vibration control mechanism in which the spring mechanism 9a and the vibration control mechanism 9b are arranged in parallel.

In the OD lock mode, a gear ratio in the first differential mechanism 10 is shifted to a high gear ratio. For example, the gear ratio is fixed to that in a higher gear side than a gear ratio that is generally used in the THS mode. Accordingly, in the OD lock mode, the engine 1 is likely to be used in a low speed range, and thus noise and vibration that are caused by booming noise is likely to occur. On the contrary, the vibration control mechanism 9 allows reduction in transmissibility of torque vibration of a drive system and thus allows suppression of the vibration and the noise. In addition, since the vibration control mechanism 9 is provided on a torque transmission path during the OD lock mode, an effect of the vibration control mechanism 9 can be exerted only in the OD lock mode.

The brake mechanism in the above first to third embodiments is the SOWC 40. However, another brake mechanism may be used instead of the SOWC 40. In addition, the specific configuration of the SOWC 40 is not limited to what has been disclosed in each of the above embodiments.

What have been described in the above embodiments and a modification can appropriately be combined and carried out.

The invention claimed is:

1. A power transmission device comprising:
    an engine arranged on a shaft;
    a first motor;
    a second motor arranged on a different shaft from the shaft on which the engine is arranged;
    a first differential mechanism having a sun gear to which the first motor is connected, a carrier to which the engine is connected, and a ring gear to which the second motor and a drive wheel are connected;
    a second differential mechanism having a first rotational element to which the first motor is connected, a second rotational element, and a third rotational element to which the engine is connected, the second differential mechanism being arranged such that the first motor is located between the first differential mechanism and the second differential mechanism in an axial direction of the engine;
    a case that houses the second differential mechanism; and
    a brake mechanism configured to restrict rotation of the second motor and the brake mechanism being configured such that an engine speed is increased by restricting rotation of the second rotational element and the engine speed is output from the ring gear, the brake mechanism being arranged in the case.

2. The power transmission device according to claim 1, further comprising:
    an oil pump arranged on a first shaft and the second differential mechanism is arranged on a second shaft; wherein
    a pump drive gear that rotationally drives the oil pump is connected to the third rotational element and the pump drive gear integrally rotates with the third rotational element.

3. The power transmission device according to claim 1, wherein
    the brake mechanism is a selectable one-way clutch that switches between a restriction state in which unidirectional rotation of the second rotational element is restricted and a permission state in which bidirectional rotation of the second rotational element is permitted.

4. The power transmission device according to claim 3, further comprising:
    an electronic control unit configured to switch the selectable one-way clutch from the restriction state to the permission state in a state that the second rotational element is rotated in an opposite direction from the unidirectional rotation by the first motor.

5. The power transmission device according to claim 3, further comprising:
    an electronic control unit configured to switch the selectable one-way clutch from the permission state to the restriction state in a state that the second rotational element is rotated in an opposite direction from the unidirectional rotation by the first motor.

6. The power transmission device according to claim 2, wherein
    the second differential mechanism and the oil pump are arranged to overlap each other in a radial direction of the second differential mechanism.

7. The power transmission device according to claim 3, wherein
    the second differential mechanism and the oil pump are arranged to overlap each other in a radial direction of the second differential mechanism.

* * * * *